US012409349B2

(12) United States Patent
Wrigley et al.

(10) Patent No.: US 12,409,349 B2
(45) **Date of Patent: *Sep. 9, 2025**

(54) BACK PLATE FOR A BREATHING APPARATUS

(71) Applicant: DRAEGER SAFETY UK LIMITED, Blyth (GB)

(72) Inventors: Gordon Wrigley, Newcastle Upon Tyne (GB); Jason Allan, North Shields (GB)

(73) Assignee: DRAEGER SAFETY UK LIMITED, Blyth (GB)

(*) Notice: Subject to any disclaimer, the term of this patent is extended or adjusted under 35 U.S.C. 154(b) by 0 days.

This patent is subject to a terminal disclaimer.

(21) Appl. No.: 18/598,078

(22) Filed: Mar. 7, 2024

(65) Prior Publication Data

US 2024/0238626 A1 Jul. 18, 2024

Related U.S. Application Data

(63) Continuation of application No. 17/253,921, filed as application No. PCT/GB2019/051703 on Jun. 18, 2019, now Pat. No. 12,023,532.

(30) Foreign Application Priority Data

Jun. 22, 2018 (GB) ...................................... 1810303

(51) Int. Cl.

| | |
|---|---|
| ***A62B 9/04*** | (2006.01) |
| ***A62B 7/02*** | (2006.01) |
| ***A62B 9/02*** | (2006.01) |
| ***A62B 25/00*** | (2006.01) |
| ***B63C 11/02*** | (2006.01) |

(52) U.S. Cl.

CPC .................. *A62B 9/04* (2013.01); *A62B 9/02* (2013.01); *A62B 25/00* (2013.01); *A62B 7/02* (2013.01); *B63C 2011/026* (2013.01)

(58) Field of Classification Search

CPC ............... B63C 2011/026; B63C 11/02; B63C 11/22; A62B 7/02; A62B 9/00; A62B 9/02; A62B 9/04; A62B 18/00; A62B 18/02; A62B 18/025; A62B 25/00; A45F 3/10

See application file for complete search history.

(56) References Cited

U.S. PATENT DOCUMENTS

| | | | | |
|---|---|---|---|---|
| 5,080,414 | A | 1/1992 | Hellquist et al. | |
| 6,276,361 | B1 * | 8/2001 | White ..................... | B63C 11/02 128/201.27 |
| 12,023,532 | B2 * | 7/2024 | Wrigley ................... | A62B 9/02 |
| 2010/0282791 | A1 | 11/2010 | Townsend et al. | |

(Continued)

FOREIGN PATENT DOCUMENTS

| | | | | |
|---|---|---|---|---|
| CN | 201959436 U | * 9/2011 | ............... | A62B 9/02 |
| DE | 102005025007 A1 | * 12/2006 | ............. | B63C 11/22 |

*Primary Examiner* — Joseph D. Boecker

(74) *Attorney, Agent, or Firm* — Banner & Witcoff, Ltd.

(57) ABSTRACT

A back plate for a breathing apparatus comprises a back plate frame for supporting a cylinder of breathable gas; and a pressure reduction valve configured to receive breathing gas from a cylinder of breathable gas; and a resiliently deformable element configured to support the pressure reduction valve on the back plate frame so as to permit relative movement between the pressure reduction valve and the back plate frame.

20 Claims, 5 Drawing Sheets

(56) References Cited

U.S. PATENT DOCUMENTS

| | | | | |
|---|---|---|---|---|
| 2011/0048421 | A1* | 3/2011 | Carr | B63C 11/02 224/633 |
| 2011/0064537 | A1* | 3/2011 | Wrigley | A62B 9/00 128/205.24 |
| 2011/0272975 | A1* | 11/2011 | Hogg | F17C 13/084 224/567 |

* cited by examiner

BACK PLATE FOR A BREATHING APPARATUS

CROSS-REFERENCE TO RELATED APPLICATIONS

This application is a continuation of U.S. application Ser. No. 17/253,921, filed Dec. 18, 2020, which claims the priority of International Application No. PCT/GB2019/051703, filed on Jun. 18, 2019, which claims priority to GB Application No. GB1810303.6, filed on Jun. 22, 2018, the entire contents of which being fully incorporated herein by reference.

BACKGROUND OF THE INVENTION

The present invention relates to a back plate for a breathing apparatus, particularly, although not exclusively, to a back plate for a self-contained breathing apparatus (SCBA).

SCBAs can be used by emergency services personnel when they enter an environment which has reduced or generally unbreathable air, such as the scene of a fire or a gas leak. Some SCBAs comprise a back plate for supporting a cylinder of breathable gas, and a pressure reduction valve, sometimes known as a first-stage pressure reduction valve, for attachment to the gas cylinder such that, in use, the valve can receive high-pressure gas from the cylinder and expel the gas at a reduced pressure suitable for inhalation, or for further pressure reduction by further pressure reduction valves downstream.

During use, breathing apparatuses can be exposed to harsh environments and use conditions including impact due to the apparatus hitting against another object while being worn or during handling. This can result in damage or failure of a component of the apparatus depending on the severity of the impact. In particular, some of the more critical components of the breathing circuit of the apparatus can be more susceptible to damage as some prior art apparatuses do not adequately protect these more critical components from all types of damage.

In some known SCBAs, the pressure reduction valve and its pneumatic connector for the gas cylinder is formed integrally with the back plate. These systems require precise alignment of the pressure reduction valve and gas cylinder for the connection to be reliably made, as misaligning these components can delay assembly, and even cause damage to the pneumatic connection. For example, it can be difficult to align threaded portions of the pressure reduction valve and a valve of the cylinder of breathable gas due to the limited range of movement permitted by these components. Furthermore, the rigid connection can transfer shock from an impact to the gas cylinder and/or to other components of the breathing apparatus. For example, shock may be transmitted to the pressure reduction valve when the gas cylinder receives an impact. These and other components may therefore be more susceptible to damage.

In some other known examples, a flexible pneumatic connection may be provided between the gas cylinder and the pressure reduction valve in the form of a ‘flying lead’ connected to the pressure reduction valve at a first end and having a pneumatic connector at a second end for attachment to the gas cylinder. Flying leads may provide advantages in the of ease of attachment between reducer and cylinder, improved impact performance, the possibility of a lower profile and centre of gravity, protection to the reducer body and flexibility of cylinder configurations. However there may be some drawbacks, as they may feature more components, leak paths and also require more maintenance.

SUMMARY OF THE INVENTION

Therefore, it will be understood that it is desirable to provide an improved breathing apparatus.

According to a first aspect of the invention there is provided a back plate for a breathing apparatus, the back plate comprising: a back plate frame for supporting a cylinder of breathable gas; and a pressure reduction valve configured to receive breathing gas from a cylinder of breathable gas; and a resiliently deformable element configured to support the pressure reduction valve on the back plate frame so as to permit relative movement between the pressure reduction valve and the back plate frame.

This allows there to be a robust and direct pneumatic connection between the gas cylinder and the pressure reduction valve, for example a fixed connection, but the resiliently deformable connection between the pressure reduction valve and the plate provides for improved absorption of shock thereby reducing damage to the pressure reduction valve itself and/or other components of the breathing apparatus. The resiliently deformable connection also allows the pressure reduction valve to be flexibly mounted to the plate such which will facilitate easier alignment of connecting parts, such as the gas cylinder and pneumatic connector of the valve, during assembly or use.

The resiliently deformable element may therefore be a single piece component configured as a shock absorber for the pressure reduction valve. The resiliently deformable element may connect the pressure reduction valve to the back plate or form a connection between the back plate frame and the pressure reduction valve. The resiliently deformable element may be a housing for the pressure reduction valve. The resiliently deformable element may therefore allow for a greater amount of movement of the pressure reduction valve and so permit for an easier alignment of the pressure reduction valve and the cylinder of breathable gas. The resiliently deformable element may releasably house the pressure reduction valve such that the valve can be removed for maintenance and cleaning.

The resiliently deformable element may be configured such that the pressure reduction valve has a rest position in which the element is not deformed. When a force is applied to the valve, such as during an impact on the valve or a cylinder attached to the valve, the resiliently deformable element may deform elastically to permit movement of the valve with respect to the back plate frame and apply a biasing or reverting force to the valve to return the valve to the rest position.

The pressure reduction valve may be a first stage pressure reduction valve. The pressure reduction valve may be configured to receive breathing gas from a breathing gas cylinder at a pressure substantially equal to the pressure at which the gas is stored in the cylinder. The cylinder may house breathable gas at a first pressure and the pressure reduction valve may be configure to release the breathable gas at a second pressure lower than the first pressure. The pressure reduction valve may therefore serve to decrease the pressurised gas to a pressure suitable for human inhalation, or to an intermediate pressure suitable for further pressure reduction in a downstream or second-stage pressure reduction valve.

The resiliently deformable element may comprise an elastomeric material. The resiliently deformable element may comprise an elastomeric material from one of the following classes: thermoplastic elastomer (TPE), polyurethane thermoplastic elastomer (TPU), polyamides, melt processable rubber, thermoplastic vulcanizate (TPY), synthetic rubber (SR) or natural rubber (NR). Such materials may further enhance the shock absorptive properties of the breathing assembly. In a particular example, the resiliently deformable element may comprise silicone rubber.

The back plate frame may be configured to at least partially house the resiliently deformable element. The back plate frame may therefore be a housing for the resiliently deformable element. Put another way, the resiliently deformable element may be at least partially housed within the back plate frame. The resiliently deformable element may be configured to at least partially house the pressure reduction valve. The resiliently deformable element may extend around a portion of the back plate frame to at least partially house the back plate frame. The resiliently deformable element may resiliently support the pressure reduction valve in a cavity of the back plate.

Such configurations may enhance the damping properties of the breathing apparatus to better absorb any shock loads transmitted to the pneumatic connection resulting from impact during use. Such configurations also allow the resiliently deformable element to be configured to least partially surround the pressure reduction valve and/or back plate frame thereby assisting to absorb any shock transmitted to these components. Housing the pressure reduction valve may also serve to protect it from dirt or dust.

The pressure reduction valve may comprise a cylinder connection or connecting element configured to pneumatically connect the pressure reduction valve and a cylinder of breathable gas. A cylinder of breathable gas may have a cylinder isolation valve, which has a mating female screw thread for connection to a corresponding male thread of the cylinder connector of the pressure reduction valve. The resiliently deformable element may comprise an opening configured to at least partially accommodate the cylinder connection.

The pressure reduction valve may be retained in the resiliently deformable element. The pressure reduction valve may be movably housed within the resiliently deformable element. For example the pressure reduction valve may be retained in the resiliently deformable element via a snap fit or ball-and-socket arrangement.

The resiliently deformable element may be a substantially solid block of resiliently deformable material. The solid block of resiliently deformable material may comprise an orifice or cavity configured to receive the pressure reduction valve.

The resiliently deformable element may be attached to the back plate frame so as to thereby permit resilient deformation of the resiliently deformable element relative to the back plate frame.

The resiliently deformable element may at least partially surround the back plate frame, thereby being configured to at least partially absorb any shock transmitted to the back plate frame. The resiliently deformable element may at least partially protrude from the back plate frame. Such configurations may enhance the back plate's shock absorption. For example, if the back plate is dropped then the resiliently deformable element may configured to absorb some of the impact that would otherwise be imparted directly to an outer surface of the back plate frame. The resiliently deformable element may extend over an outer surface of a lower portion, or a lowermost portion of the back plate.

The pressure reduction valve and the gas cylinder may be rigidly connected. The more simplistic and reliable direct pneumatic connection between these two components may therefore be employed while the risk of damage to the connection may be inhibited as the resiliently deformable element is capable of absorbing any transmitted shock.

The resiliently deformable element may be of a one-piece design. The resiliently deformable element may be integral with the back plate frame. The resiliently deformable element may be integrally moulded.

At least one fixing, e.g. a screw, may be provided for securing the resiliently deformable element to the back plate frame.

Where the back plate is configured to house the resiliently deformable element, the resiliently deformable element may be removably received in the back plate. The resiliently deformable element may comprise a cavity for receiving the pressure reduction valve and a closure portion for retaining the valve in the cavity. In an uninstalled configuration, the closure portion may be biased into an open position in which it does not retain the valve in the cavity. Installing the resiliently deformable element into the back plate may cause a portion of the back plate to deform or move the closure element towards a closed position in which it retains the valve in the cavity.

According to second aspect of the invention there is provided a breathing apparatus comprising a back plate according to the first aspect; and a cylinder of breathable gas connected to the pressure reduction valve and supported by the back plate; and a harness configured to support the back plate on a user's back.

The breathing apparatus may be configured as a wearable breathing apparatus, the apparatus may further comprise at least one strap configured to support the breathing apparatus on a user.

The breathing apparatus may be an SCBA (self-contained breathing apparatus) or a SCUBA (self-contained underwater breathing apparatus) or a CCBA (Closed Circuit Breathing Apparatus).

According to a third aspect of the invention, there is provided a resiliently deformable element for use with a back plate or breathing apparatus according to any of the first or second aspects.

The skilled person will appreciate that except where mutually exclusive, a feature described in relation to any one of the above aspects may be applied mutatis mutandis to any other aspect. Furthermore except where mutually exclusive any feature described herein may be applied to any aspect and/or combined with any other feature described herein.

BRIEF DESCRIPTION OF THE DRAWINGS

Examples of the present invention will now be described, by way of example, with reference to the accompanying drawings, in which.

DETAILED DESCRIPTION OF THE INVENTION

Figure 1:
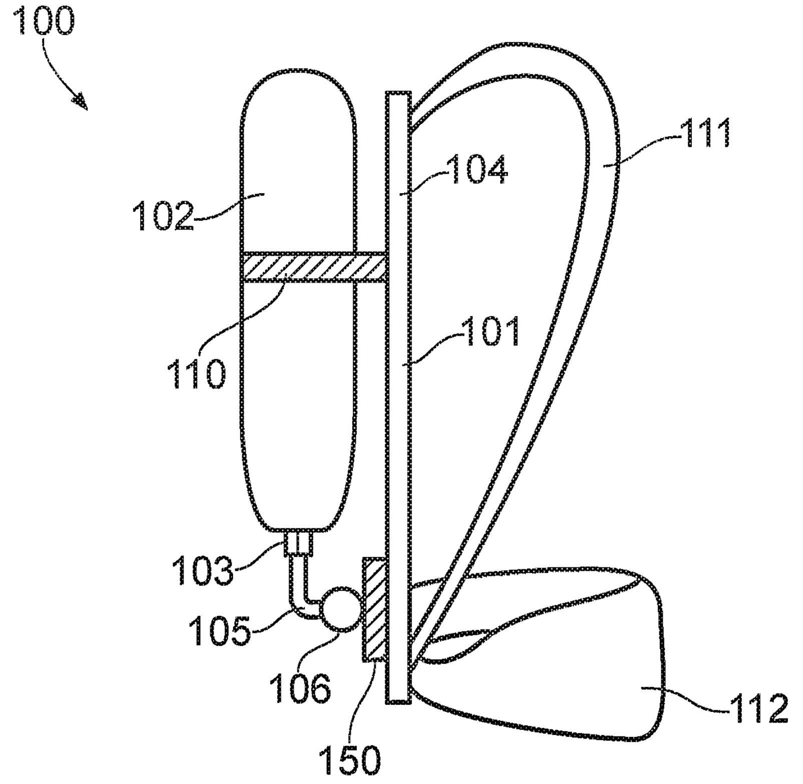
FIG. 1 shows a side view of a back plate according to an example of the invention.

FIG. 1 shows an example back plate 101 for a breathing apparatus 100. The back plate comprises a back plate frame 104 for supporting a cylinder 102 of breathable gas, and a pressure reduction valve 106 configured to receive breathing gas from the cylinder 102 of breathable gas. The back plate 101 has two shoulder straps 111 and a waist belt 112 for supporting the breathing apparatus 100 on a user's back in use.

The back plate 101 comprises a resiliently deformable element 150 configured to support the pressure reduction valve 106, which in this example is a first-stage pressure reduction valve 106, on the back plate frame 104 so as to permit relative movement between the pressure reduction valve 106 and the back plate frame 104. The resiliently deformable element 150 is arranged on an outward-facing lower part of the back plate frame 104 such that a breathing gas cylinder 102 can be connected to the pressure reduction valve 106 and extend longitudinally along the back plate 101. A retaining strap 110 is provided to extend about the cylinder 102 and retain it against the back plate 101.

A coupling 105 connects the cylinder 102 of breathable gas to the pressure reduction valve 106. In this example, the coupling 105 is a fixed coupling, e.g. a rigid coupling. In other example the coupling 105 may be a flexible coupling, such as a flying lead. Typically, the cylinder 102 comprises a cylinder isolation valve, which is threadedly connected to the cylinder. The cylinder isolation valve incorporates an isolation valve arrangement and typically has a female connection screw thread, which is configured to receive a male connection thread provided on the pressure reduction valve 106 or flying lead connector.

The cylinder 102 of breathable gas may be configured to house a breathable gas at a first pressure. The cylinder 102 may comprise a first valve 103 configured to release the breathable gas at the first pressure. The pressure reduction valve 106 may be configured to release the breathable gas at a second pressure. The second pressure may be lower than the first pressure. The valve 103 of the cylinder is configured to permit opening and closing such that the supply of gas from the cylinder can be stopped and started as desired by the user. In some examples, the cylinder 102 may connect directly to the pressure reduction valve 106 without an intermediate coupling 105. In other examples, the coupling 105 may be integral to the cylinder 102 and may attach to the pressure reduction valve 106.

In use, one or more hoses (not shown) may be connected to the pressure reduction valve 106 to distribute the breathable gas to a user. The user may inhale the breathing gas using a lung demand valve (not shown).

The resiliently deformable element 150 is attached to or secured to the back plate frame 104. Alternatively the resiliently deformable element 150 may be part of the back plate frame 104. Accordingly the back plate frame 104 may comprise the resiliently deformable element 150. The resiliently deformable element 150 is configured as a solid block for permitting relative movement between the pressure reduction valve 106 and the back plate frame 104. The resiliently deformable element 150 may be attached to the back plate frame 104 so as to permit resilient deformation of the resiliently deformable element 150 relative to the back plate frame 104. It should be understood that by resiliently deformable, the material of the resiliently deformable element may be elastically deformable such that the pressure reduction valve 106 may move relative to the back plate frame 104. The resiliently deformable element 150 is configured such that the pressure reduction valve 106 has a rest position in which the element 150 is not deformed. When a force is applied to the valve 106, the element 150 may deform elastically and apply a biasing or reverting force to the valve 106 to return the valve to the rest position. In this example, the resiliently deformable element 150 comprises an elastomeric material, for example the resiliently deformable element 150 may be formed from rubber and or silicone. In this particular embodiment, the resiliently deformable element 150 is formed from silicone rubber. Silicone rubber may be particularly advantageous for use in the as it may maintain good flexibility at low temperatures which may be caused by the expansion of breathing gas in the valve 106.

In use, any shock imparted to the back plate 101, the valve 106, or the cylinder 102 may be transmitted to and at least partially absorbed by the resiliently deformable element 150 resulting in a reduced chance of damage to components of the back plate 101 or the connection between the pressure reduction valve 106 and the cylinder coupling 105.

Examples of the invention will now be described with reference to FIGS. 2, 3, 4, and 5. To avoid unnecessary repetition of subject matter, in these examples like reference numbers, increased by 100, identify generally the same concepts so that the feature with reference number 200 of FIG. 2 corresponds to the feature 100 in FIG. 1 etc.

Figure 2:
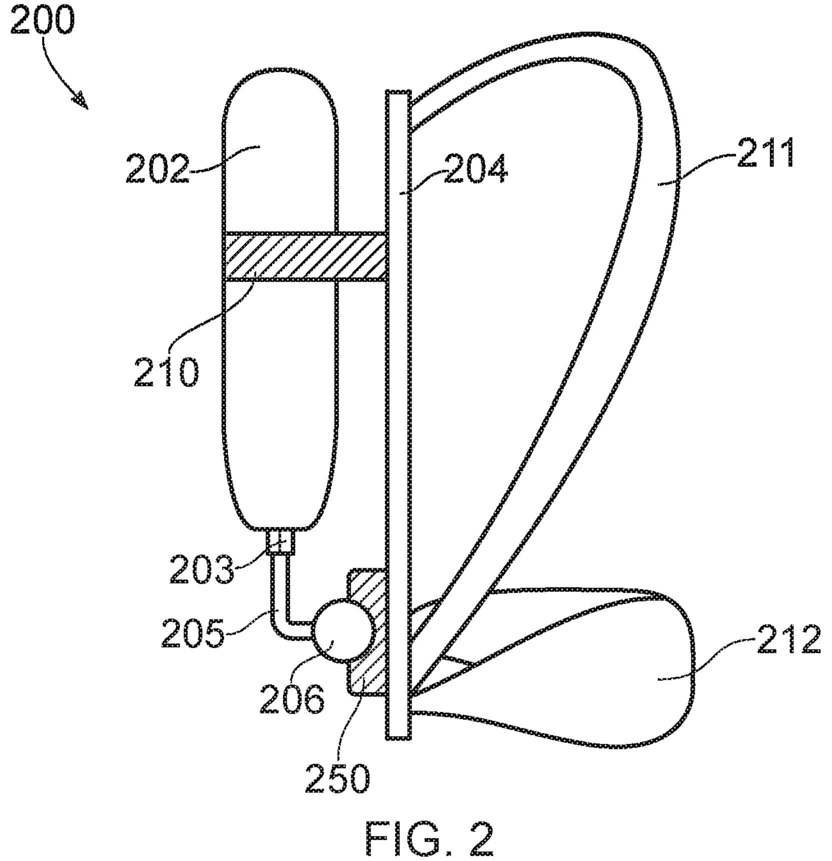
FIG. 2 shows a side view of a back plate according to a further example of the invention.

FIG. 2 shows a back plate 202 for a breathing apparatus 200. The back plate 202 differs from the example shown in FIG. 1 in that the resiliently deformable element 250 is configured as a housing for the pressure reduction valve 206. Accordingly the resiliently deformable element 250 is configured to at least partially house the pressure reduction valve 206. The resiliently deformable element 250 at least partially surrounds the pressure reduction valve 206. The resiliently deformable element 250 is configured as a substantially solid block of resiliently deformable material comprising a cavity for receipt of the pressure reduction valve 206.

The pressure reduction valve 206 may be movably disposed within the resiliently deformable element 250. A ball-and-socket or snap-fit arrangement may contain the pressure reduction valve 206 within the resiliently deformable element 250. As the resiliently deformable element 250 is inherently deformable, it may be configured such that it can be deformed to install the valve 206 and then revert to an original shape to thereby grip or cradle the valve 206.

Figure 3:
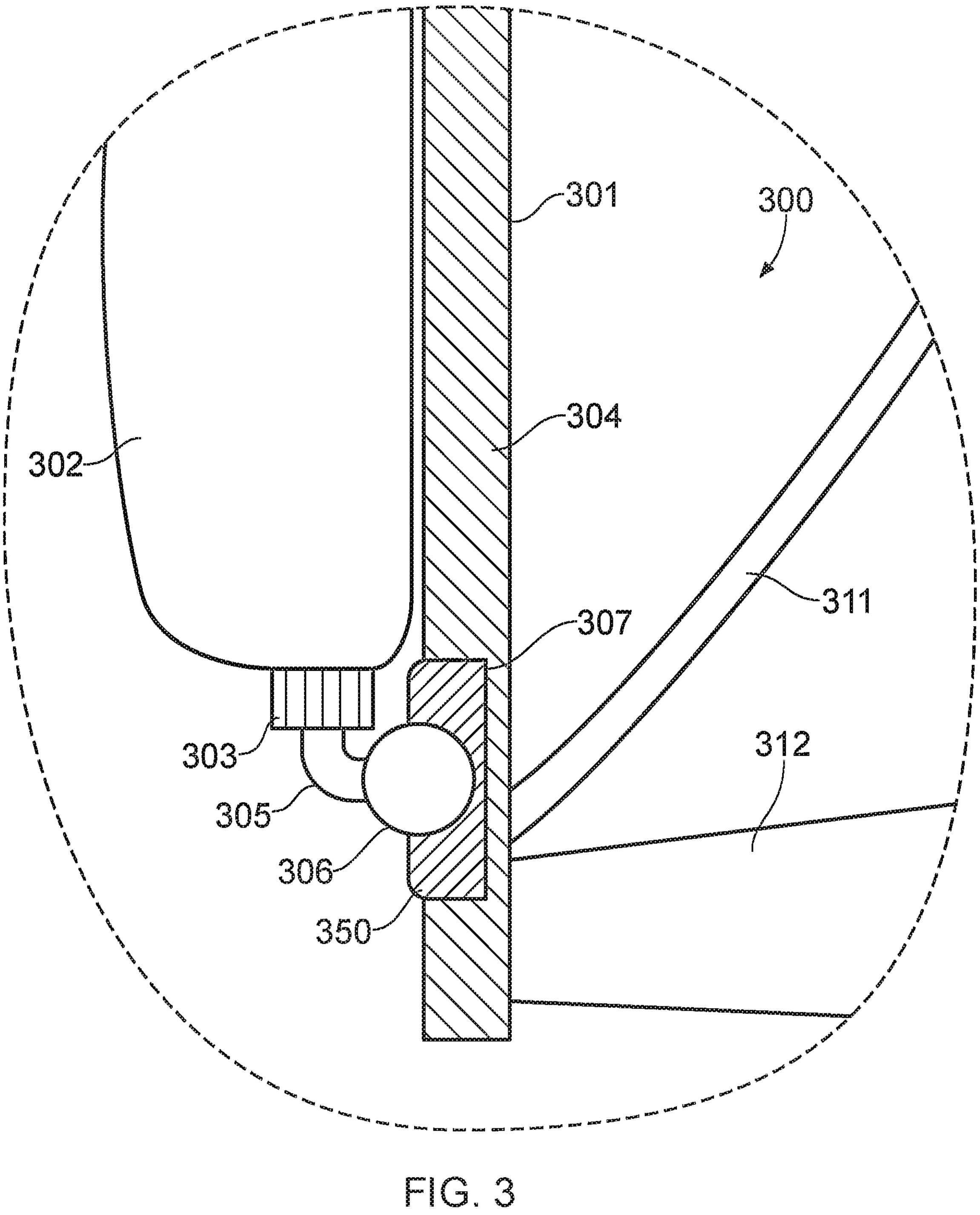
FIG. 3 shows a detailed sectional side view of a back plate according to a yet further example of the invention.

FIG. 3 shows a back plate 302 for a breathing apparatus 300. The back plate 302 differs from the example shown in FIGS. 1 and 2 in that the back plate frame 304 is configured to at least partially house the resiliently deformable element 350. Accordingly, the back plate frame 304 is configured as a housing for the resiliently deformable element 350.

The back plate frame 304 therefore comprises a recess 307 configured to at least partially accommodate the resiliently deformable element 350. The back plate frame 304 at least partially surrounds the resiliently deformable element 350.

In one example the resiliently deformable element 350 is integral with the back plate frame 304. In this and other examples, the resiliently deformable element 350 may extends out and around of a recess of the back plate frame 304 and at least partially surrounds the back plate frame 304 to provide a bumper element on the exterior of the back plate frame 104, for example on a lower portion of the back plate frame.

Although FIG. 3 shows the resiliently deformable element 350 being configured to at least partially house the pressure reduction valve 306 it will be appreciated that in other examples the resiliently deformable element 350 may not be configured as a housing for the pressure reduction valve 306. According to one example, a back plate may comprise a resiliently deformable element as described with reference to, and as shown in FIG. 1, the resiliently deformable element being provided within a recess of the back plate frame.

Figure 4A:
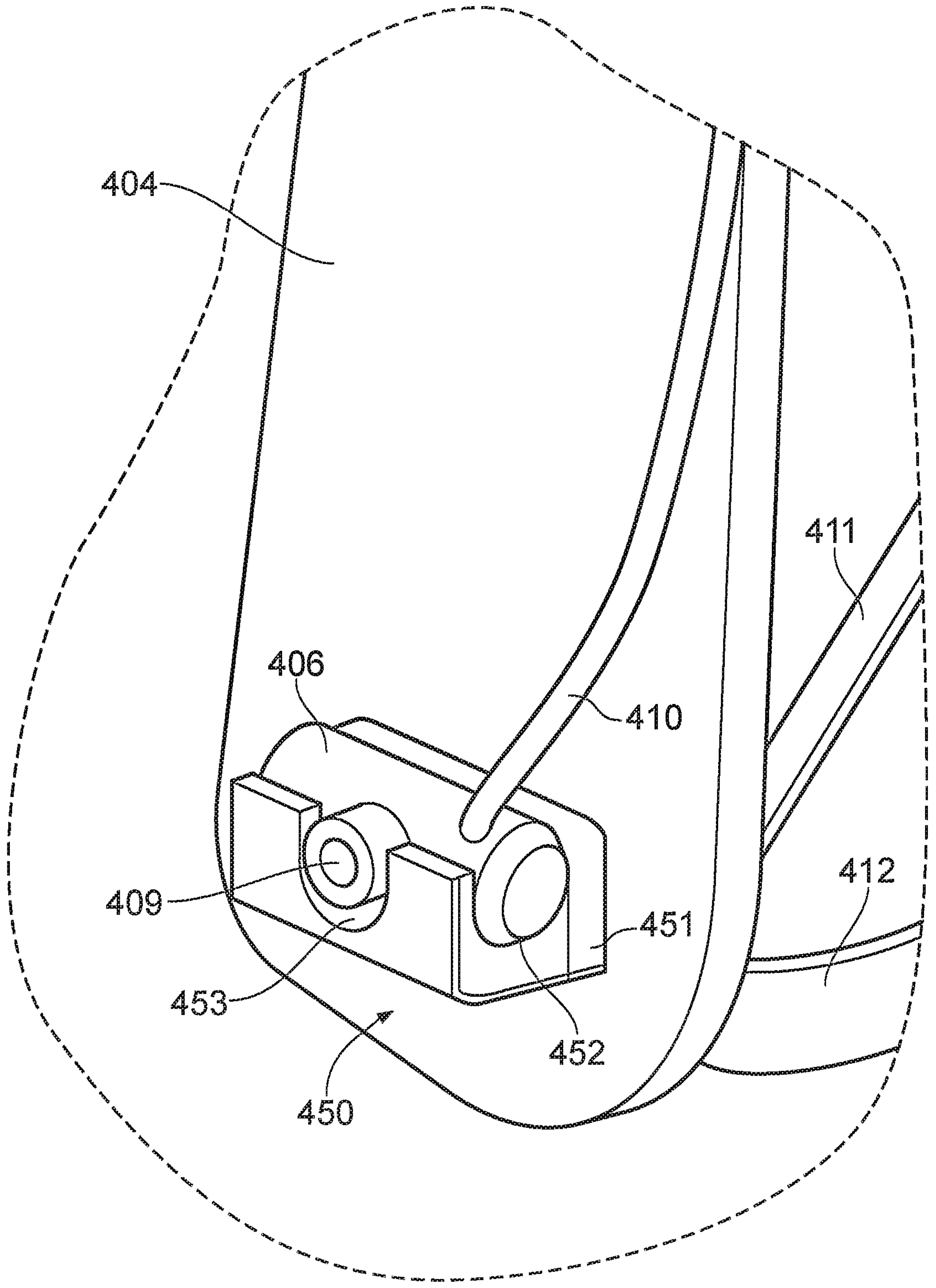
FIGS. 4A and 4B show perspective views of an example resiliently deformable element and back plate without and with a gas cylinder connected respectively.

FIG. 4A shows an example resiliently deformable element 450 which may be used in any of the examples shown in FIG. 1, 2 or 3. As illustrated in this figure, a cylinder is not installed to the breathing apparatus.

The resiliently deformable element 450 is configured as a housing for a pressure reduction valve 406. The pressure reduction valve 406 comprises a gas cylinder connection 409 for connection with the first valve on the cylinder of breathable gas (not shown in FIG. 4) and a breathing hose 410 for suppling breathing gas at the second, lower, pressure to the user so that the user may breathe the breathable gas.

The resiliently deformable element 450 comprises a body 451 which comprises the resiliently deformable material. The body 451 at least partially surrounds the pressure reduction valve 406. The body 451 comprises an orifice 452, in the form an elongate channel, for receiving the pressure reduction valve 406 and an opening 453 configured to accommodate the gas cylinder connection 409 of the pressure reduction valve 406. The pressure reduction valve 406 may therefore be accommodated in the resiliently deformable element 450 such that pneumatic connection is maintained between the pressure reduction valve 406 and the cylinder of breathable gas, as will be described below.

The orifice 452 may be configured as a cutaway in the body 451 such that the pressure reduction valve 406 is not wholly, by rather partially, surrounded by the resiliently deformable element 450. The breathing hose 410 extends away from the pressure reduction valve 406 through the orifice 452. In an alternative arrangement, the resiliently deformable element 450 may be configured to substantially or completely surround the pressure reduction valve 406 and may be provided with at least one opening or orifice for allowing at least one of the gas cylinder connection and breathing hose therethrough.

Any mechanism of retaining the pressure reduction valve 406 within the resiliently deformable element 450 is within the scope of this disclosure. For example, the pressure reduction valve 406 may be movably disposed in the resiliently deformable element 450 to permit relative movement therebetween. A snap-fit may retain the pressure reduction valve 406 in the resiliently deformable element 450, for example within an orifice 452 of the connection. Accordingly, the orifice 452 may be complementarily designed relative to the pressure reduction valve. A ball-and-socket arrangement may also be employed to receive the pressure reduction valve within the orifice of the resiliently deformable element 550.

In examples where the pressure reduction valve comprises more than one breathing hose, further openings in the connection may be provided for accommodating these additional hoses.

The body 451 may be integrally moulded. The body 451 may be a single piece. In one example, the body may substantially completely surround the pressure reduction valve 406.

The body may be configured as a clip for retaining the pressure reduction valve.

Figure 4B:
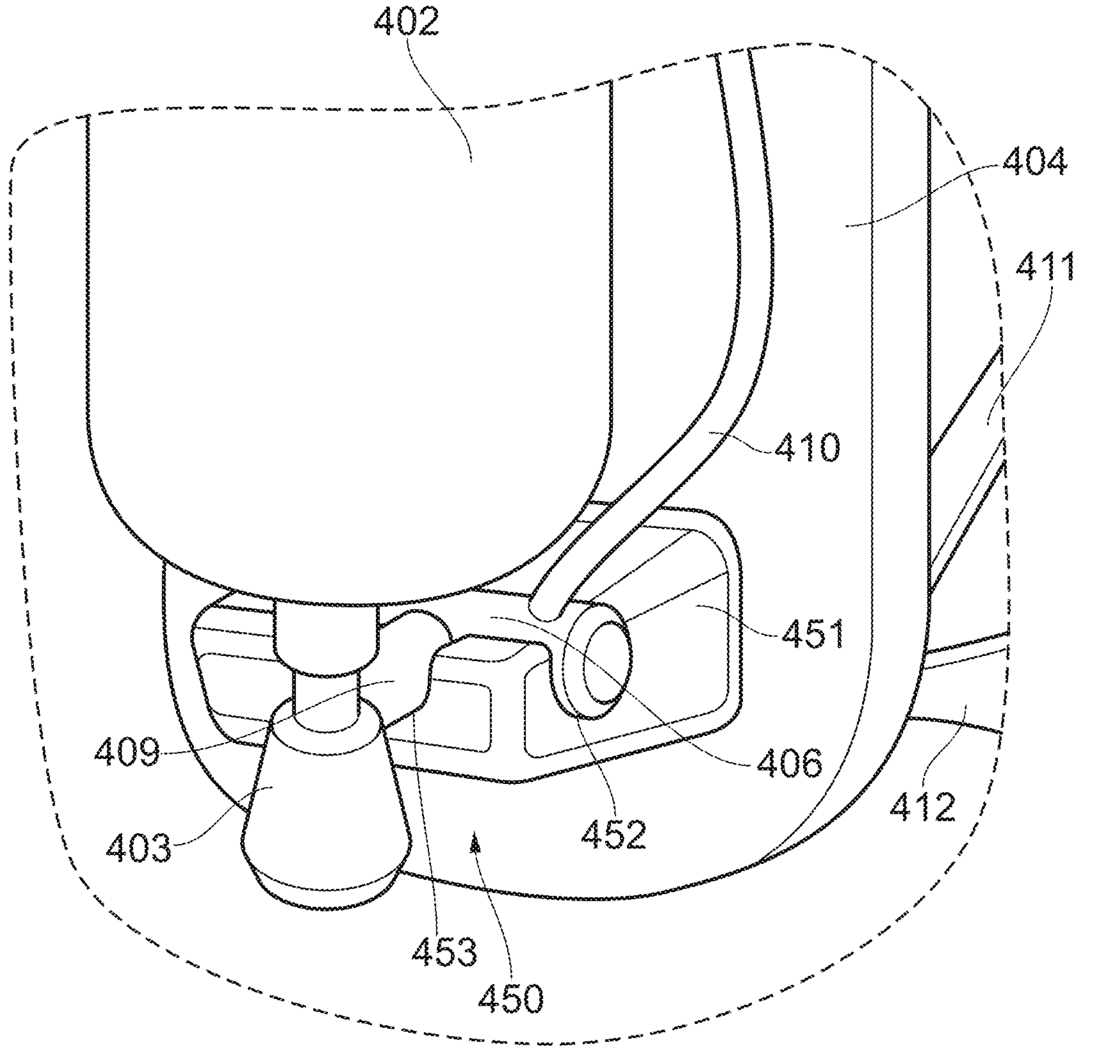

FIG. 4B shows the example arrangement of FIG. 4A with a cylinder 402 connected to the pressure reduction valve 406. As can be appreciated, an impact on the cylinder 402, the cylinder valve 403, or the pressure reduction valve 406 would result in movement of the pressure reduction valve 406, which is permitted to move relative to the back plate frame 404 by elastic deformation of the body 451 of the element 450.

Figure 5:
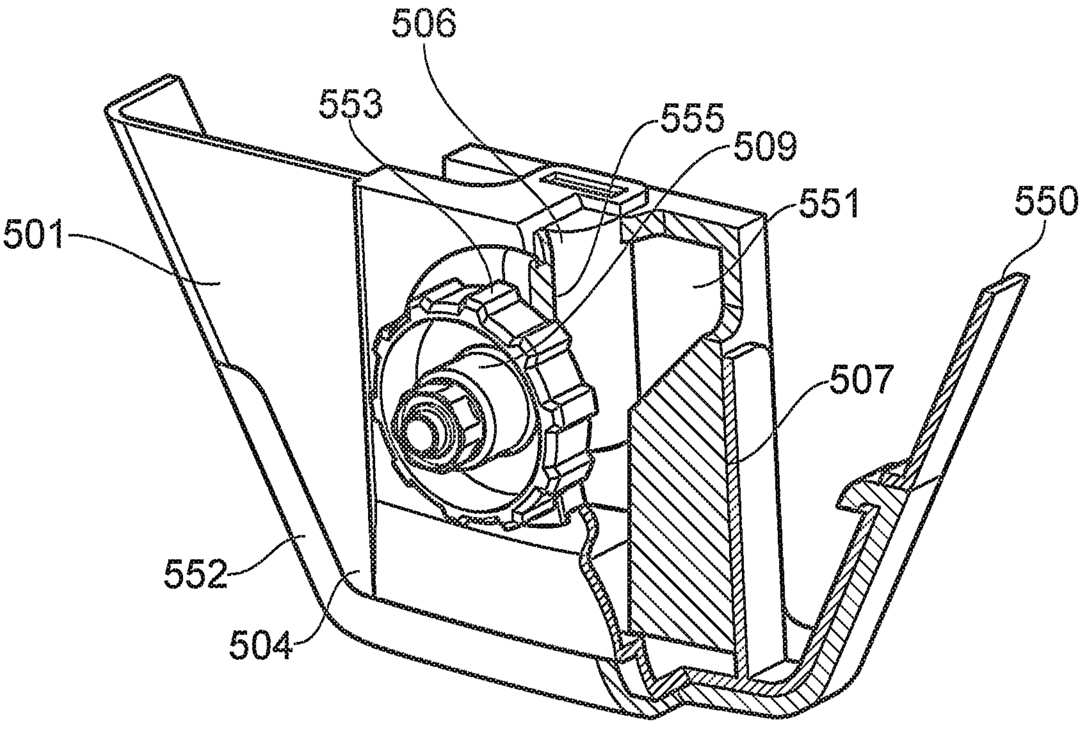
FIG. 5 shows a perspective view of a further example back plate comprising a resiliently deformable element for use in the back plate of FIG. 1, 2 or 3.

FIG. 5 shows a cut-away view of the lower portion of an example back plate 501 comprising a resiliently deformable element 550 which may be used in either of the examples shown in FIG. 1, 2 or 3.

The resiliently deformable element 550 comprises a body 551 configured to house the pressure reduction valve 506. The body 551 at least partially surrounds the pressure reduction valve 506. The pressure reduction valve 506 may be at least partially received in an orifice or cavity of the element 550. The pressure reduction valve 506 comprises a gas cylinder connection 509. The body 551 comprises an opening 553 configured to accommodate the gas cylinder connection 509. The gas cylinder connection 509 is configured as a threaded wheel. Accordingly a gas cylinder (not shown) may be threadedly connected to the pressure reduction valve 506 and rotation of the wheel may tighten or loosen the connection of the gas cylinder to the pressure reduction valve 506. As discussed above, the cylinder may compromise a cylinder valve, which has a separate rotational hand wheel, which opens and closes an isolation valve.

As shown in FIG. 5, the resiliently deformable element 550 at least partially surrounds the back plate frame 504. Specifically, the body 551 comprises an external portion 552, in particular a bumper portion 552, that surrounds an external part, and in particular the lower part, of the back plate frame 504. Accordingly the resiliently deformable element 550 is provided within a portion of the back plate frame 504 and extends out and around a portion of the back plate frame 504. Such a configuration enhances the shock absorptive properties of the back plate 501.

Accordingly, the resiliently deformable element 550 at least partially protrudes form the back plate frame 504.

The resiliently deformable element 550 may be fixed within a recess 507 of the back plate frame 504. Alternatively, the resiliently deformable element 550 may be movably housed within the back plate frame 504. The pressure reduction valve 506 may be movably housed within the body 551.

In some examples, such as the configuration of FIG. 5, the back plate frame 504 is configured to house the resiliently deformable element in a recess 507 in a removable manner. The resiliently deformable element 550 comprises a cavity 555 for receiving and at least partially enclosing the pressure reduction valve. In some examples, the element 550 may further comprise a closure portion, such as a resiliently deformable flap, for retaining the valve in the cavity 555. When the resiliently deformable element is outside of the recess of the back plate frame, the closure portion may be biased into an open position in which it does not retain the valve in the cavity 555 of the resiliently deformable element. In such examples, installing the resiliently deformable element into the back plate may cause a portion of the back plate frame to deform or move the closure element towards a closed position in which it retains the valve in the cavity 555, for example by pressing a deformable flap against the cavity 555.

While the invention has been illustrated and described in detail in the drawings and foregoing description, such illustration and description are to be considered illustrative or exemplary and not restrictive; the invention is not limited to the disclosed embodiments. Various alternative examples are discussed through the detailed description. Other variations to the disclosed embodiments can be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. Any reference signs in the claims should not be construed as limiting the scope.

For the avoidance of doubt, the present disclosure extends to the subject matter recited in the following numbered Paras:

Para 1. A back plate for a breathing apparatus, the back plate comprising:

a back plate frame for supporting a cylinder of breathable gas;

a pressure reduction valve configured to receive breathing gas from a cylinder of breathable gas supported by the back plate frame; and a resiliently deformable element configured to support the pressure reduction valve on the back plate frame so as to permit relative movement between the pressure reduction valve and the back plate frame.

Para 2. A back plate as claimed in Para 1 wherein the resiliently deformable element comprises an elastomeric material.

Para 3. A back plate as claimed in Para 2, wherein the elastomeric material is selected from one of the classes: thermoplastic elastomer, polyurethane thermoplastic elastomers, polyamides, melt processable rubber, thermoplastic vulcanizate, synthetic rubber, or natural rubber.

Para 4. A back plate as claimed in Para 3, wherein the resiliently deformable element comprises silicone rubber.

Para 5. A back plate as claimed in any preceding Para wherein the back plate frame is configured to at least partially house the resiliently deformable element.

Para 6. A back plate as claimed in any preceding Para wherein the resiliently deformable element is configured to at least partially house the pressure reduction valve.

Para 7. A back plate as claimed in any preceding Para wherein the resiliently deformable element extends around a portion of the back plate frame to at least partially house the back plate frame.

Para 8. A back plate as claimed in any preceding Para wherein the pressure reduction valve comprises a cylinder connection configured to pneumatically connect the pressure reduction valve and a cylinder of breathable gas, and wherein the resiliently deformable element comprises an opening configured to at least partially accommodate the cylinder connection.

Para 9. A back plate as claimed in any preceding Para wherein the pressure reduction valve is retained in the resiliently deformable element via a snap fit or ball-and-socket arrangement.

Para 10. A back plate as claimed in any preceding Para wherein the pressure reduction valve is movably housed within the resiliently deformable element.

Para 11. A back plate as claimed in any preceding Para wherein the resiliently deformable element is a substantially solid block of resiliently deformable material comprising a cavity for receiving the pressure reduction valve.

Para 12. A back plate as claimed in any preceding Para wherein the resiliently deformable element is attached to the back plate frame so as to thereby permit resilient deformation of the resiliently deformable element relative to the back plate frame.

Para 13. A back plate as claimed in any preceding Para wherein the pressure reduction valve and the gas vessel are rigidly connected.

Para 14. A breathing apparatus comprising:

a back plate according to any preceding Para; and a cylinder of breathable gas connected to the pressure reduction valve and supported by the back plate; and a harness configured to support the back plate on a user's back.

Para 15. A resiliently deformable element for use with a back plate according to any of Paras 1-13.

The invention claimed is:

1. A back plate for a breathing apparatus, the back plate comprising:

a back plate frame for supporting a cylinder of breathable gas;

a pressure reduction valve configured to receive breathing gas from the cylinder of breathable gas supported by the back plate frame; and a resiliently deformable element configured to support the pressure reduction valve on the back plate frame so as to permit relative movement between the pressure reduction valve and the back plate frame, wherein the pressure reduction valve comprises a cylinder connection configured to pneumatically connect the pressure reduction valve and the cylinder of breathable gas, and wherein the resiliently deformable element comprises an opening configured to at least partially accommodate the cylinder connection.

2. A back plate as claimed in claim 1, wherein the resiliently deformable element comprises an elastomeric material.

3. A back plate as claimed in claim 2, wherein the elastomeric material is selected from one of the classes: thermoplastic elastomer, polyurethane thermoplastic elastomers, polyamides, melt processable rubber, thermoplastic vulcanizate, synthetic rubber, or natural rubber.

4. A back plate as claimed in claim 3, wherein the resiliently deformable element comprises silicone rubber.

5. A back plate as claimed in claim 1, wherein the back plate frame is configured to at least partially house the resiliently deformable element.

6. A back plate as claimed in claim 1, wherein the resiliently deformable element is configured to at least partially house the pressure reduction valve.

7. A back plate as claimed in claim 1, wherein the resiliently deformable element extends around a portion of the back plate frame to at least partially house the back plate frame.

8. A back plate as claimed in claim 1, wherein the pressure reduction valve is retained in the resiliently deformable element via a snap fit or ball-and-socket arrangement.

9. A back plate as claimed in claim 1, wherein the pressure reduction valve is movably housed within the resiliently deformable element.

10. A back plate as claimed in claim 1, wherein the resiliently deformable element is a substantially solid block of resiliently deformable material comprising a cavity for receiving the pressure reduction valve.

11. A back plate as claimed in claim 1, wherein the resiliently deformable element is attached to the back plate frame so as to thereby permit resilient deformation of the resiliently deformable element relative to the back plate frame.

12. A back plate as claimed in claim 1, wherein the pressure reduction valve and the cylinder of breathing gas are rigidly connected.

13. A breathing apparatus comprising:

a back plate according to claim 1; and the cylinder of breathable gas connected to the pressure reduction valve and supported by the back plate; and a harness configured to support the back plate on a user's back.

14. A resiliently deformable element configured to support a pressure reduction valve on a back plate frame of a back plate for a breathing apparatus so as to permit relative movement between the pressure reduction valve and the back plate frame;

wherein the back plate frame is for supporting a cylinder of breathable gas, and the pressure reduction valve is configured to receive breathing gas from a cylinder of breathable gas supported by the back plate frame; and wherein the pressure reduction valve comprises a cylinder connection configured to pneumatically connect the pressure reduction valve and the cylinder of breathable gas, and wherein the resiliently deformable element comprises an opening configured to at least partially accommodate the cylinder connection.

15. A resiliently deformable element as claimed in claim 14, wherein the resiliently deformable element comprises an elastomeric material.

16. A resiliently deformable element as claimed in claim 15, wherein the elastomeric material is selected from one of the classes: thermoplastic elastomer, polyurethane thermoplastic elastomers, polyamides, melt processable rubber, thermoplastic vulcanizate, synthetic rubber, or natural rubber.

17. A resiliently deformable element as claimed in claim 14, wherein the resiliently deformable element comprises silicone rubber.

18. A resiliently deformable element as claimed in claim 14, wherein the resiliently deformable element is configured to at least partially house the pressure reduction valve.

19. A resiliently deformable element as claimed in claim 14, wherein the resiliently deformable element is configured to extend around a portion of the back plate frame to at least partially house the back plate frame.

20. A resiliently deformable element as claimed in claim 14, wherein the resiliently deformable element is a substantially solid block of resiliently deformable material comprising a cavity for receiving the pressure reduction valve.

* * * * *